United States Patent [19]
O'Brien et al.

[11] Patent Number: 6,088,376
[45] Date of Patent: Jul. 11, 2000

[54] VERTICAL-CAVITY-SURFACE-EMITTING SEMICONDUCTOR DEVICES WITH FIBER-COUPLED OPTICAL CAVITY

[75] Inventors: John O'Brien; Philip Platzman, both of Pasadena; Amnon Yariv, San Marino; Axel Scherer, Laguna Beach; William Marshall, Pasadena, all of Calif.

[73] Assignee: California Institute of Technology, Pasadena, Calif.

[21] Appl. No.: 09/039,975

[22] Filed: Mar. 16, 1998

Related U.S. Application Data

[60] Provisional application No. 60/040,925, Mar. 17, 1997.

[51] Int. Cl.$^7$ ..................................... G02B 6/36
[52] U.S. Cl. .......................... 372/50; 372/20; 372/23; 372/96; 372/102; 438/29; 438/31; 438/32; 438/34; 438/35; 438/37; 257/98; 385/37

[58] Field of Search ................... 372/92, 96, 45, 372/43, 44, 50, 20, 23, 6; 438/29, 31–32, 34–35, 37; 257/98; 385/37, 88

[56] References Cited

U.S. PATENT DOCUMENTS

| | | | |
|---|---|---|---|
| 4,786,132 | 11/1988 | Gordon | 372/96 |
| 4,955,028 | 9/1990 | Alferness et al. | 372/20 |
| 5,305,336 | 4/1994 | Adar et al. | 372/6 |
| 5,434,939 | 7/1995 | Matsuda | 385/88 |

*Primary Examiner*—Rodney Bovernick
*Assistant Examiner*—Quyen P. Leung
*Attorney, Agent, or Firm*—Fish & Richardson, PC

[57] ABSTRACT

A semiconductor light-emitting device having an optical cavity with a fiber grating. A vertical-cavity-surface-emitting laser can be constructed to produce single-mode tunable laser oscillation and signal wavelength conversion.

26 Claims, 4 Drawing Sheets

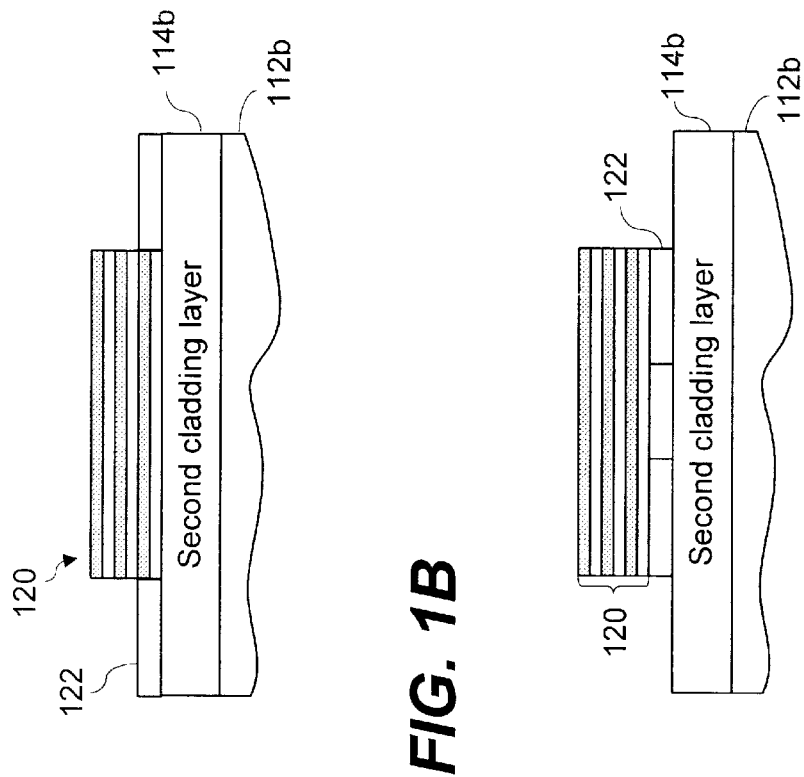
FIG. 1A
FIG. 1B
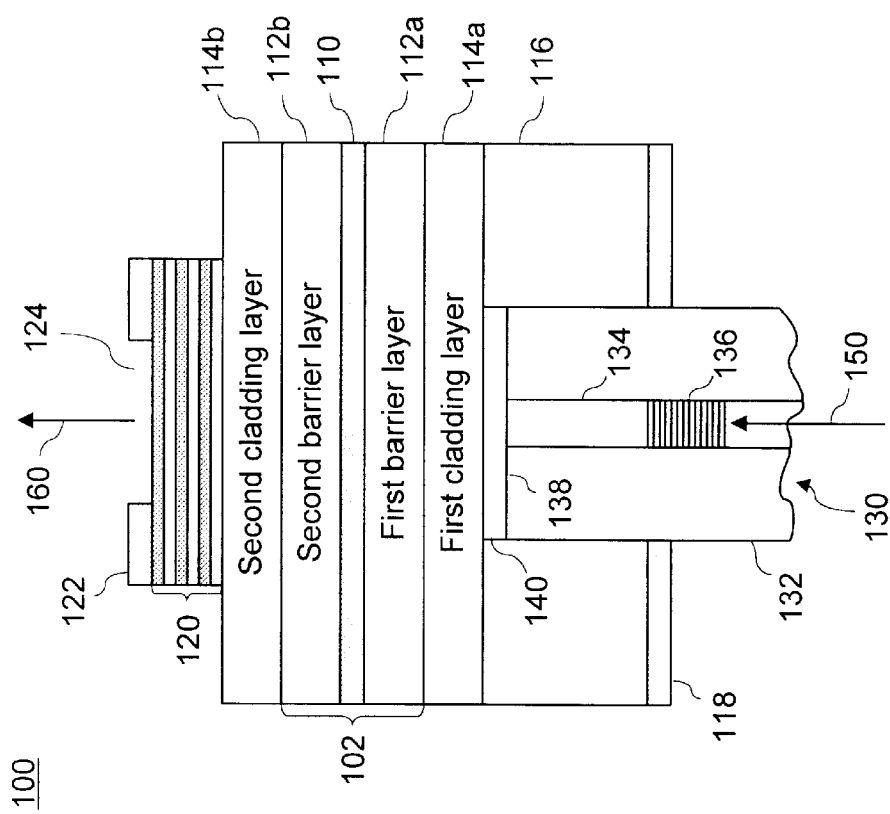
FIG. 1

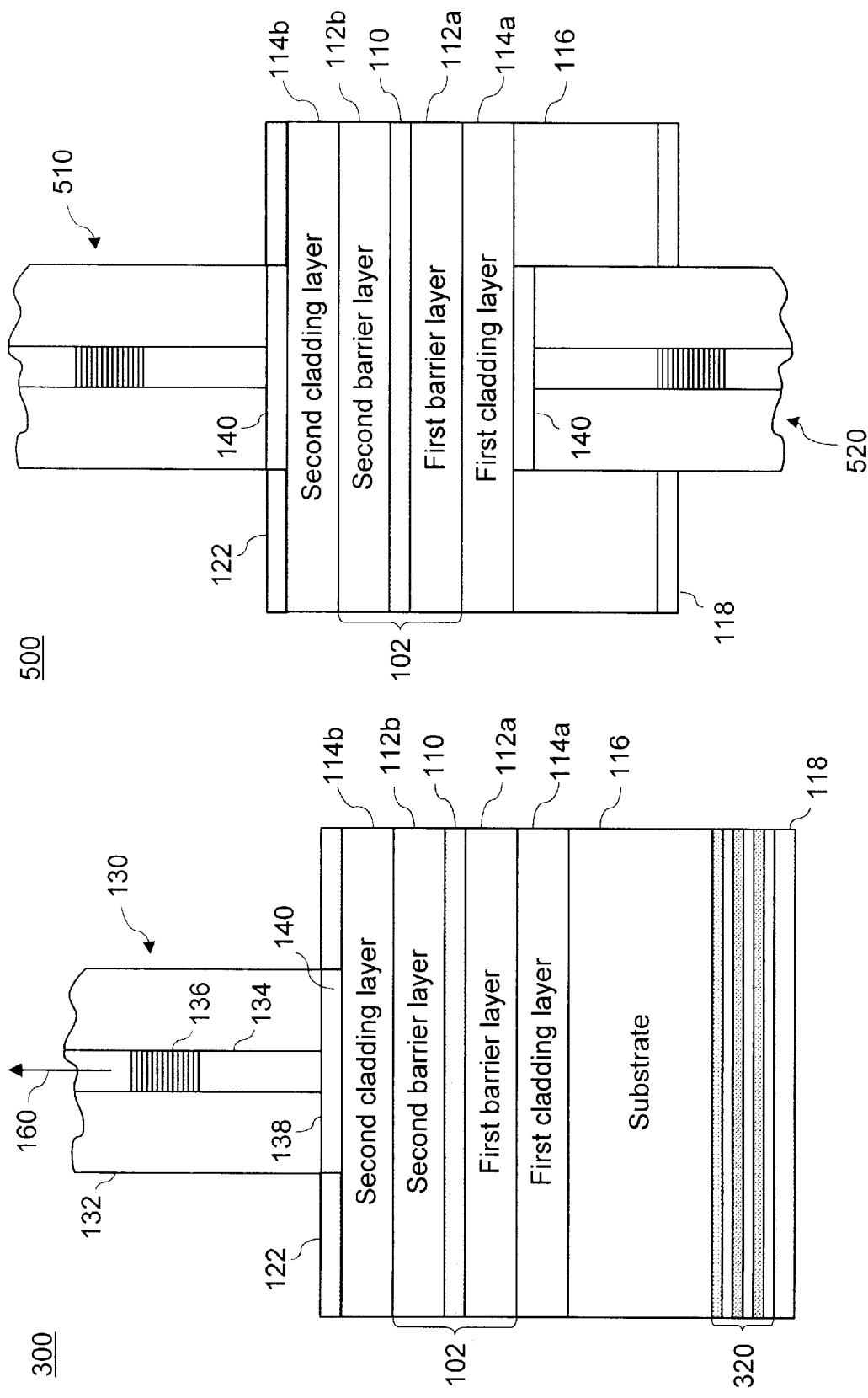

VERTICAL-CAVITY-SURFACE-EMITTING SEMICONDUCTOR DEVICES WITH FIBER-COUPLED OPTICAL CAVITY

This application claims the benefit of U.S. Provisional Application No. 60/040,925 filed on Mar. 17, 1997, which is incorporated herein by reference.

FIELD OF THE INVENTION

The present invention relates to semiconductor optoelectronic devices, and more specifically, to semiconductor light-emitting devices in a vertical-cavity-surface-emitting configuration.

BACKGROUND OF THE INVENTION

Light-emitting diodes ("LEDs") and diode lasers are semiconductor light-emitting devices that produce light through radiative recombination of electrons and holes at a p-n junction formed by either bulk semiconductor materials or quantum well structures. Quantum well p-n heterojunctions have been used to achieve improved light-producing efficiency.

LEDs operate based on the spontaneous emission of photons. An optical cavity may be used in a LED to increase the output intensity. Diode lasers, on the other hand, operate based on the stimulated emission of photons and population inversion. In particular, a diode laser requires an optical cavity to provide necessary optical feedback with a net gain equal to or exceeding the total cavity loss to generate laser oscillations.

LEDs and diode lasers may be configured to have a vertical-cavity-surface-emitting configuration in which the optic axis of an optical cavity is essentially perpendicular to the semiconductor layers including the active layer(s). Thus, the light emitted by such devices is substantially perpendicular to the semiconductor layers. Vertical-cavity-surface-emitting lasers ("VCSELs") can be advantageously used in a wide range of applications to replace edge-emitting diode lasers, such as optical data processing and optical data transmission.

SUMMARY OF THE INVENTION

The present invention provides semiconductor light-emitting devices have a fiber-coupled vertical optical cavity with at least one reflective end formed by a reflective fiber grating in a fiber. One end of the fiber is physically engaged to one or more semiconductor layers at a location adjacent to the active light-emitting region such that a portion of the optical path inside the optical cavity is formed by the fiber.

Such semiconductor light-emitting devices exhibit unique properties and features. For example, the vicinity of the fiber end to the light-emitting region and the fiber as part of the intracavity optical path produce a high fiber coupling efficiency; the fiber coupled to the cavity can be used to provide direct fiber link to other fiber optic components or devices by techniques such as fusion splicing.

One embodiment of the invention is a VCSEL or a VCSEL array in which a fiber grating is coupled to a cladding layer through the substrate to form one reflective end of the optical cavity. A reflective element such as a mirror or a Bragg reflector may be formed on the opposite side of the active layer(s) as the other end of the optical cavity. Both electrical pumping and optical pump may be used to energize the laser. In implementing optical pumping, a pump beam may be preferably introduced into the active layer(s) by the fiber in which the fiber grating is formed.

Another embodiment of the invention is a VCSEL or a VCSEL array in which a fiber grating is coupled to a cladding layer from the opposite side of the substrate to form one reflective end of the optical cavity. A reflective element such as a mirror or a Bragg reflector may be formed on the substrate side of the active layer(s) as the other end of the optical cavity.

Yet another embodiment is a VCSEL or a VCSEL array in which two fiber gratings of the same reflective wavelength are respectively coupled to cladding layers on both sides of the active layer(s) to form the optical cavity.

However constructed, the laser wavelength of any of the above VCSELs is the reflective wavelength of the fiber grating that satisfies a Bragg phase-matching condition. This reflective wavelength of the fiber grating should be within the gain spectral profile of the active layer(s). As the Bragg condition changes, the laser wavelength changes accordingly. This provides a tunable mechanism in a VCSEL. For example, a transducer may be engaged to the fiber grating to vary the grating period for tuning the laser.

Laser oscillation in a single transverse mode may be achieved by using a fiber grating formed of a single-mode fiber. Since a portion of the optical path within the optical cavity is formed of this single-mode fiber, other modes are automatically attenuated.

One aspect of the invention is improved temperature stability compared to a diode laser with a cavity formed by the semiconductor materials on the substrate. This is in part because the fiber grating is outside the region on the substrate that is heated by the driving current and in part because the Bragg condition in the fiber grating is not sensitive to a temperature change.

Another aspect of the invention is simultaneous generation of laser oscillations in the same active layer(s) at different laser wavelengths. One way to achieve this couples a plurality of fibers with gratings of different periods to one side of the active layer(s) such that different fibers produce different laser wavelengths. Another way uses a fiber grating with a chirped grating period or multiple gratings of different grating periods such that multiple reflections at different wavelengths can be achieved in a single fiber grating cavity.

Yet another aspect of the invention is signal conversion in a wavelength-division multiplexing system. For example, an optical signal can be used to pump a fiber-coupled VCSEL to produce a laser at a longer wavelength. Since the optical signal is modulated by data, the generated laser is also modulated in the same way. This effects a data conversion from the pump wavelength into the laser wavelength.

A further aspect of the invention uses the fiber grating to fully explore the available laser gain spectral range of a VCSEL. For certain wavelengths within a gain spectral range of an active semiconductor medium, it may be difficult to find a lattice-matched Bragg reflector. The fiber grating in the vertical cavity can be configured to produce a Bragg reflective wavelength at any of such wavelengths for laser oscillation.

These and other embodiments, aspects and advantages of the invention will become more apparent in light of the following detailed description, including the accompanying drawings and appended claims.

BRIEF DESCRIPTION OF THE DRAWINGS

FIG. 1 is a diagram illustrating a cross-sectional view of one embodiment of a fiber-coupled VCSEL.

FIGS. 1A and 1B are diagrams showing two alternative implementations of an ohmic contact in a fiber-coupled VCSEL.

FIG. 3 is a diagram illustrating a cross-sectional view of another embodiment of a fiber-coupled VCSEL.

FIG. 5 is a diagram illustrating a VCSEL with a vertical cavity formed by two opposing fiber gratings.

DETAILED DESCRIPTION OF THE PREFERRED EMBODIMENTS

Figures 2A, 2B:
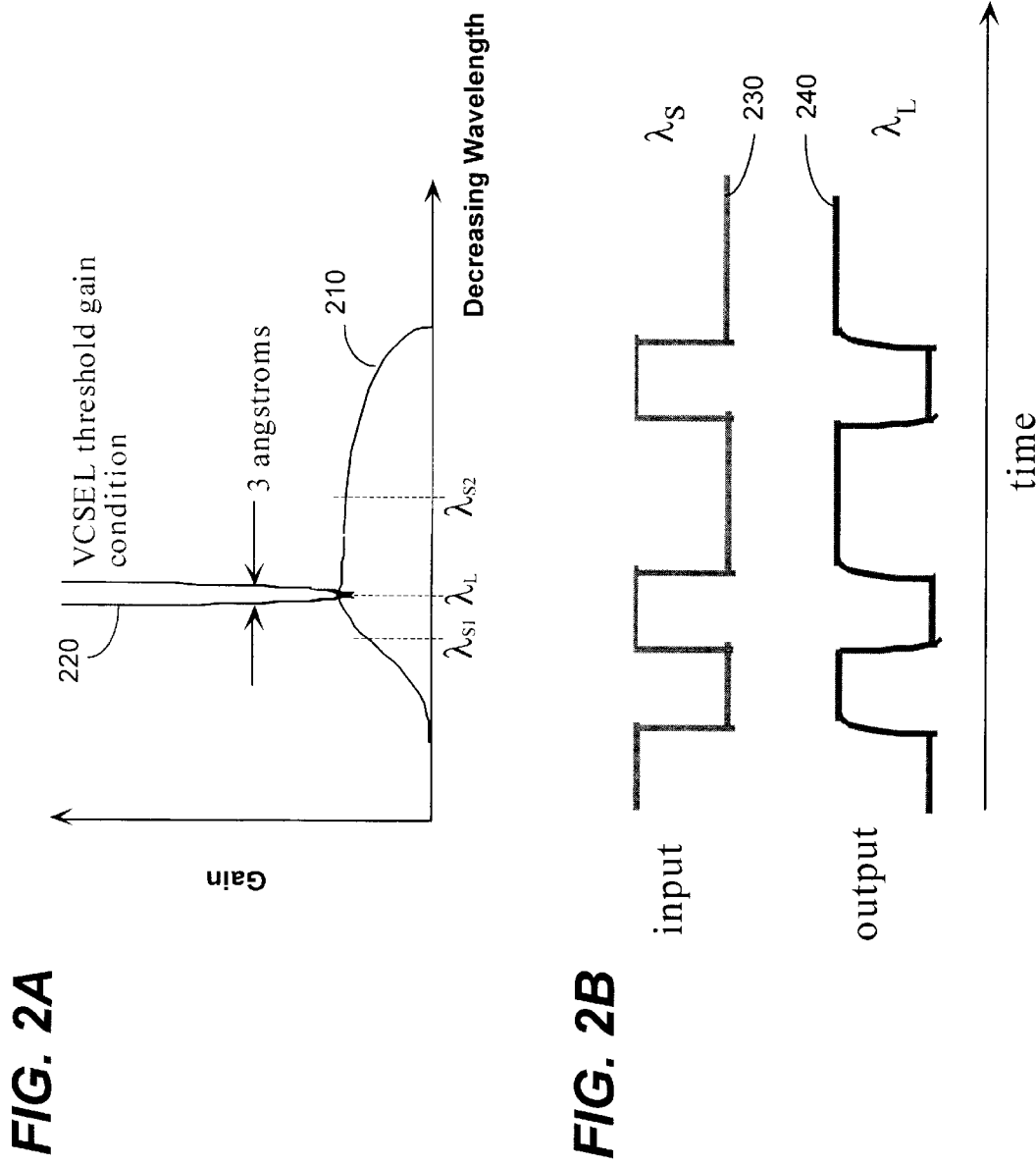
FIG. 2A is a chart showing an exemplary gain curve of a VCSEL and the respective spectrum of the fiber-coupled cavity loss.
FIG. 2B is a chart showing a data-bearing signal at a wavelength with a positive gain and a corresponding modulated laser output in time domain.

The invention is now described with specific reference to exemplary embodiments of VCSELs having a fiber-coupled optical cavity. It should be understood that the invention is generally applicable to any semiconductor light-emitting device based on a vertical cavity configuration, and more specifically, to both VCSELs and LEDs. An optic fiber used in the exemplary embodiments may be replaced by any other optical wave-guiding element such as a dielectric waveguide.

FIG. 1 shows one embodiment 100 of a fiber-coupled VCSEL. An active semiconductor layer 110 is sandwiched between first and second barrier layers 112a and 112b to form an active light-emitting medium 102. At least one of the first and second barrier layers 112a and 112b is made of a semiconductor material with a bandgap larger than that of the center active layer 110. Preferably, both barrier layers 112a and 112b have bandgaps larger than that of the center layer 110 to form a double heterojunction which confines carriers within the active layer 110. The thickness of the center layer 110 may be reduced to a small value and the barrier layers 112a and 112b may be configured to form a single-crystal lattice with the center layer 110 so that the active medium 102 effects a quantum-well double heterojunction. The active medium 102 may also have two or more quantum-well double heterojunction structures stacked together to form a multiple-quantum-well structure.

Two cladding layers 114a and 114b having bandgaps larger than that of the center active layer 110 are respectively formed on the sides of the active medium 102 to provide optical confinement in a direction perpendicular to the semiconductor layers since the indices of refraction of the cladding layers 114a and 114b are smaller than the center layer 110. The active medium 102 and the cladding layers 114a and 114b are formed on a substrate 116 so that the device 100 is monolithically integrated.

A fiber 130 is engaged at an end facet 138 to the semiconductor layers by a hole formed in the substrate 116 using a known processing technique (e.g., etching). The fiber 130 has an inner core 134 which is processed to form a fiber grating 136 and an outer layer 132 which may include a cladding layer for confining light. The end facet 138 is preferably polished and has an anti-reflection coating 140 for reducing optical reflection. The end facet 130 is located in a vicinity of the active medium 102 to provide efficient optical coupling between the fiber 130 and the active medium 102. As an example illustrated in FIG. 1, the end facet 138 is directly coupled to the first cladding layer 114a. The fiber grating 136 is configured to reflect light at the selected laser wavelength, thus optical feedback for the VCSEL 100. This forms a first end of the optical cavity.

A second end of the optical cavity is formed by a Bragg reflector 120 which includes multiple alternating quarter-wavelength dielectric layers at the selected laser wavelength for producing a high reflectivity. The layers in the Bragg reflector 120 may be lattice-matched to form a single-crystal stack. The optical cavity formed by the Bragg reflector 120 and the fiber grating 136 has a cavity optic axis perpendicular to the semiconductor layers. In FIG. 1, the Bragg reflector 120 is formed over the second cladding layer 114b. Alternatively, the indices of the layers in the Bragg reflector 120 may be chosen to be smaller than that of the active layer 110 so that the Bragg reflector 120 may also provide optical confinement and the second cladding layer 114b may be eliminated.

In general, the Bragg reflector 120 may be disposed at any location on the second side of the active medium 102 to provide optical feedback as long as desired electrical bias can be applied to the active medium 102. More generally, any suitable optical reflective element may be used to replace the Bragg reflector 120.

Ohmic contacts 118 and 122 are respectively formed on the substrate 116 and the Bragg reflector 120 to inject carriers into the active layer 110 as electrical excitation and to provide a forward bias in the p-n junction in the active medium 102. This can be done by, for example, connecting the ohmic contacts 118 and 122 to an electrical current source. The ohmic contact 122 as shown has a central aperture 124 for optical input/output which may be eliminated by using an optically transparent ohmic contact material.

In general, the ohmic contacts 118 and 122 may be located anywhere on the opposite sides of the active medium 102. For example, the ohmic contact 122 may be directly formed over the second cladding layer 114b as illustrated in FIGS. 1A and 1B.

The semiconductor layers on one side of the active layer 110 may be doped to exhibit a conducting type (e.g., p-type) different from the semiconductor layers located on the other side (e.g., n-type). Therefore, if the first barrier layer 112a, the first cladding layer 114a, and the substrate 116 are n-doped, the second barrier 112b and the second cladding layer 114b are then p-doped. Accordingly, the electrical potential of the ohmic contact 122 should be higher than that of the ohmic contact 118 so that a current is injected to flow from the ohmic contact 122 to the ohmic contact 118.

The fiber grating 136 formed in the fiber 130 can be used to control the selected laser wavelength and to provide a frequency tuning for the VCSEL 100 in FIG. 1 in addition to providing optical feedback. The grating period, $\Lambda$, and the effective index of refraction in the grating, $n_g$, determine the wavelength of the optical feedback to the active medium 102, thus determining the laser wavelength. Light within the vertical cavity enters the grating 136 at a nearly normal incidence to produce a reflected light at a laser wavelength, $\lambda_L$, that satisfies a Bragg phase-matching condition:

$$\lambda_L = 2 n_g \Lambda.$$

Therefore, the product $n_g \Lambda$ determines the laser wavelength $\lambda_L$. The fiber grating 136 is configured in such a way that $2 n_g \Lambda$ is within the gain spectral range of the active medium 102. When excited by either optical pumping or electrical pumping, the active medium 102 can emit photons by spontaneous emission at any wavelength within the gain spectral range. However, the fiber grating can be used to have a sufficient reflectivity only for light at $\lambda_L = 2 n_g \Lambda$ to overcome the cavity loss. Light at any other wavelength is either not reflected by the fiber grating 136 or reflected with a reduced reflectivity that is not sufficient to overcome the loss. Therefore, only light at $\lambda_L=2n_g\Lambda$ can build up from spontaneous emission to stimulated emission, thereby establishing laser oscillation at $\lambda_L$.

Accordingly, if the fiber grating 136 can be maintained to have a constant product $n_g\Lambda$, the laser wavelength $\lambda_L$ is also maintained at a constant at $2n_g\Lambda$ even when the temperature or other parameters of the semiconductor layers (e.g., the layers 110, 112a, 112b in 102) are changed.

Consider an example of temperature stability of the VCSEL 100. As in most semiconductor lasers, only a portion of the energy in the injected driving current is converted into light and the remaining energy is dissipated in the VCSEL 100 as heat. This heat dissipation causes a change in the temperature. Other factors may also affect the temperature of the device such as a temperature change in the environment in a deployed optical communication system. However effected, such temperature change in the active medium 102 is known to cause a change in the laser wavelength in absence of any wavelength control mechanism. This effect is undesirable in many applications, especially in wavelength-division multiplexing fiber systems. Therefore, using the fiber grating 136 to control the laser wavelength can maintain the stability of the VCSEL 100.

The temperature of the fiber grating 136 may also change. But this change is much smaller than that of the semiconductor layers. This is partially because that fiber material (e.g., silica) is less sensitive to the temperature than semiconductor layers and partially because the heat generated by the medium 102 is not easily transferred to the fiber grating 136. In addition, the fiber grating 136 can be placed in a location away from the heat-generating area in the VCSEL 100 (e.g., the active medium 102) to reduce the amount of temperature change. Furthermore, the effect on the $n_g\Lambda$ caused by the temperature change in the fiber grating 136 (e.g., about 0.01 nm/degree) is much smaller (e.g., up to or greater than a factor of 10) than that caused by the temperature change in the semiconductor layers (e.g., about 0.06 nm/degree~0.15 nm/degree in semiconductor VCSELs). Hence, the fiber grating 136 provides improved temperature stability.

The fiber grating 136 is a frequency tuning element. The laser wavelength $\lambda_L$ can be tuned within the gain spectral range of the active layer 110 by changing the product $n_g\Lambda$. Thus, at least one of $n_g$ and $\Lambda$ can be adjusted to tune the laser wavelength $\lambda_L$. For example, a fiber stretcher (e.g., a piezo transducer) can be used to change the grating period $\Lambda$ for tuning the laser wavelength $\lambda_L$. This frequency tunability is important in many applications such as optical modulation and wavelength-division multiplexing.

The tunability of the fiber grating 136 can be further used as an active control means for controlling the laser wavelength. A feedback loop can be used to sense the change in the laser wavelength $\lambda_L$ to generate an error signal indicative of the change with respect to a reference laser wavelength. The error signal is then used to control the fiber grating 136 by, for example, adjusting the control voltage on a piezo fiber stretcher engaged to the fiber grating 136, to lock the laser wavelength to the reference wavelength. For example, the error signal may be produced based on the temperature of the fiber grating 136 to correct a respective drift in the laser wavelength.

The fiber grating 136 can provide high reflectivity in a wide range of laser wavelengths by configuring the product $n_g\Lambda$. This feature can be advantageously used to fully explore the available laser gain spectral range of semiconductor materials. For certain wavelengths within a gain spectral range of an active semiconductor medium, it may be difficult to find a lattice-matched Bragg reflector in a VCSEL requiring such lattice matched configuration. The fiber grating 136 thus can be configured to produce a Bragg reflective wavelength at any of such wavelengths for laser oscillation.

When a laser output with a single transverse mode is needed from the VCSEL 100 of FIG. 1, the fiber 130 may be preferably a single-mode fiber. Since the intracavity optical path between the Bragg reflector 120 and the fiber grating 136 include a portion of the fiber core 134, the fiber core 134 determines the transverse mode of the laser oscillation. Modes other than the mode(s) permitted by the fiber core 134 will be attenuated.

The laser energy in the VCSEL 100 may be coupled out of the cavity through either side. One of the Bragg reflector 120 and the fiber grating 136 may have a small transmissivity at the laser wavelength XL (e.g., a few percent) to produce a laser output.

Either optical pumping or electrical pumping may be used to energize the VCSEL 100 and both CW and pulsed operations may be achieved.

An optically pumped VCSEL 100 may be further used for signal conversion in addition to producing a laser output. An optical pump beam from a pump source may be introduced into the active medium 102 from either side of the vertical cavity in a direction parallel to the cavity axis. In addition, a pump beam may be introduced in a direction perpendicular to the cavity axis, i.e., parallel to the active layers. FIG. 1 shows an example in which a pump beam 150 at a pump wavelength $\lambda_P$ enters the cavity from the fiber 130. The pump wavelength $\lambda_P$ is smaller than the laser wavelength $\lambda_L=2n_g\Lambda$ set by the fiber grating 136 and the gain spectrum of the active layer 110. Since the pump beam 150 does not satisfy the Bragg phase-matching condition of the fiber grating 136, it transmits through the fiber grating to reach the active medium 102. The Bragg reflector 120 may be used to produce an output beam 160 at the laser wavelength $\lambda_L$.

An intensity variation in the pump beam 150 can be reflected in a respective intensity variation in the laser output 160 within a certain input pump intensity range. When the pump beam 150 is modulated to carry information by amplitude modulation, this information can be transferred onto the laser output 160, but at a different wavelength. Thus, this operation effects a signal conversion from one wavelength to another red-shifted wavelength.

The above signal conversion scheme may be more generally applied to converting information in a data-bearing signal of any wavelength within a certain range. The wavelength of the data-bearing signal can be longer or shorter than the laser wavelength as long as the active medium 102 has a positive gain at that wavelength. Such data-bearing signal will be amplified by the active medium 102. This amplification can reduce the available gain for the laser oscillation at the laser wavelength $\lambda_L=2n_g\Lambda$ and thus cause a reduction in the laser output of the fiber-coupled VCSEL. The data-bearing signal may be introduced into the active medium 102 to overlap with the optical path of the laser oscillation from any direction such as along the cavity optic axis or parallel to the active layer in the medium 102.

FIG. 2A shows an exemplary gain spectral curve 210 of a fiber-coupled VCSEL. Curve 220 represents the cavity loss of the fiber-coupled vertical optical cavity with a bandwidth, for example, of 3 angstroms. The curve 220 has a minimum loss at the laser wavelength $\lambda_L=2n_g\Lambda$ set by the fiber grating at which the gain is equal to the cavity loss. A data-bearing signal at a wavelength $\lambda_S$ within the gain curve 210 can cause a gain modulation at the laser wavelength $\lambda_L$. Both signal up-conversion and down-conversion may be achieved. For example, a data-bearing signal at $\lambda_{S1}$ is up-converted in frequency domain and a data-bearing signal at $\lambda_{S2}$ is down-converted. FIG. 2B further shows a data-bearing signal 230 at $\lambda_S$ and the corresponding laser output 240 at $\lambda_L$.

However implemented, such an optical signal converter can be used in wavelength-division multiplexed communications devices and systems or other applications that require this type of signal conversion.

Many modifications to the coupled fiber 130 may be implemented to explore the advantages and diversity provided by the fiber-coupled VCSEL 100. For example, the fiber 130 may be configured to have one or more additional fiber gratings that have different grating periods than the fiber grating 136 in the fiber core 134. Each fiber grating produces a reflected wavelength within the gain spectrum of the active layer 110. This effects two or more optical cavities of different resonant wavelengths in the VCSEL 100. When properly pumped either optically or electrically, multiple laser oscillations at different wavelengths controlled by the fiber gratings can be generated. Alternatively, the grating of the fiber grating 136 may vary with a position along the core 134 (e.g., chirped) to effect multiple laser oscillations at different wavelengths.

For another example, a portion of the fiber 130 may be doped with active ions (e.g., Er doped) to have an optical gain that overlaps the gain spectrum of the active layer 110. The doped portion may be located between the fiber grating 136 and the end facet 138 to increase the total gain within the optical cavity. A separate pump beam is needed to pump this doped fiber section. Alternatively, the doped portion may be outside the cavity to simply amplify the laser output. The gain of the active medium 102 can still be modulated to modulate the laser output. In addition, another fiber without a fiber grating may be coupled to the Bragg reflector 120 such that the VCSEL 100 is fiber pigtailed. This fiber may have a doped gain to amplify the output.

Other embodiments are also contemplated. FIG. 3 shows an embodiment 300 in which the fiber 130 is coupled to the second cladding grating 114b from the other side of the active layer 110. A Bragg reflector 320 is formed on the substrate 116 to form an equivalent optical cavity with the fiber grating 136.

Figure 4:
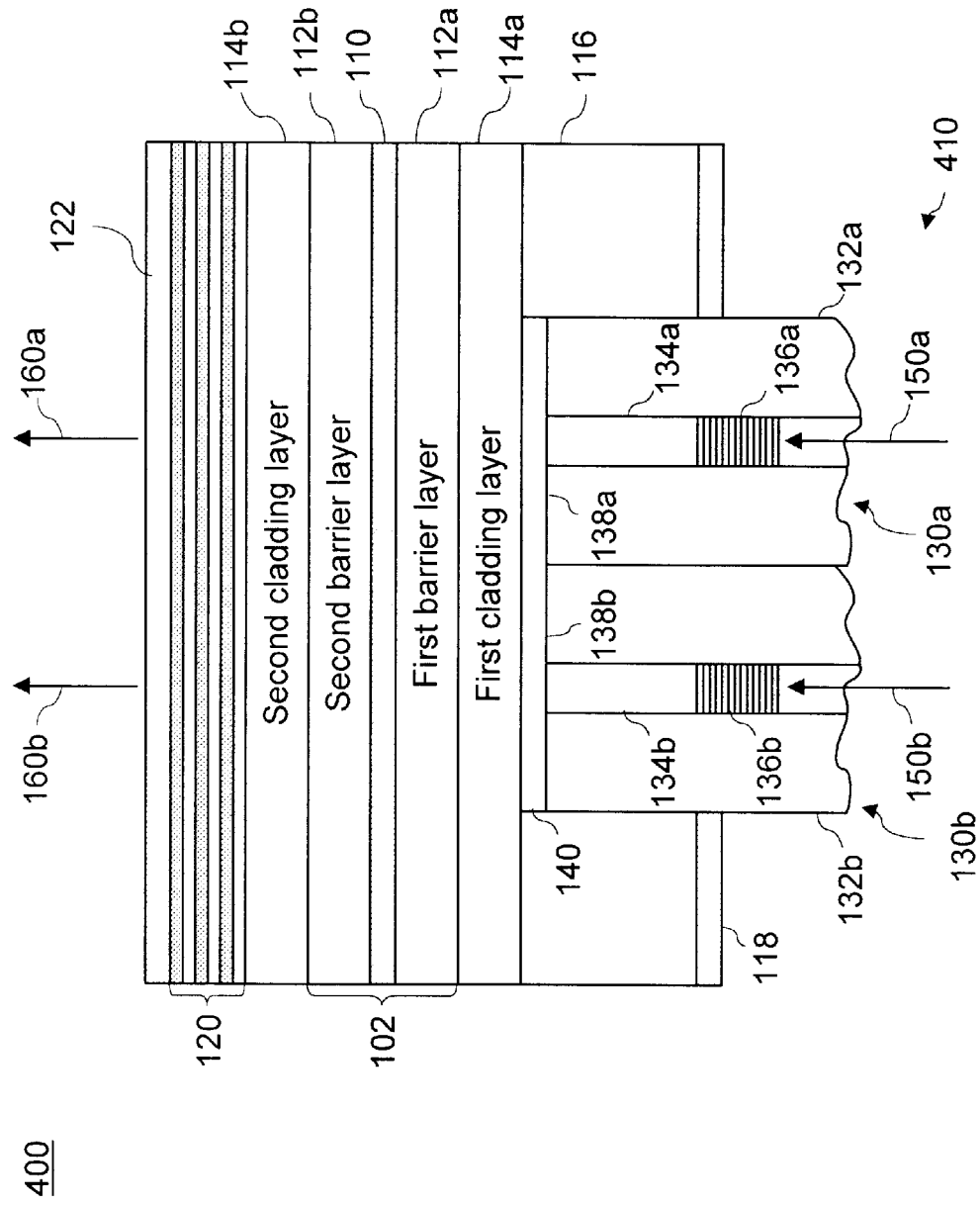
FIG. 4 is a diagram illustrating a VCSEL with a plurality of fiber-coupled cavities.

FIG. 4 shows an embodiment 400 having two or more fibers with built-in fiber gratings to couple to one side of the active medium 102. This embodiment effects two or more parallel optical cavities. Each fiber grating may be configured at a different laser wavelength such that multiple laser outputs at different wavelengths can be produced with the same active medium 102. Specifically, FIG. 4 illustrates an optically-pumped VCSEL with a fiber bundle 410 having a plurality of fibers (e.g., 130a, 130b) coupled to the first cladding layer 114a. Multiple optical beam beams (e.g., 150a, 150b) are respectively introduced to the fibers to produce multiple laser output beams (160a, 160b). This device can be used as a multi-channel signal converter in data processing or communication system using signals of multiple wavelengths.

FIG. 5 shows another embodiment 500 that uses two fibers 510 and 520 with gratings to form a vertical optical cavity. Preferably, the fiber gratings in the fibers 510 and 520 are identical to each other.

Other modifications and enhancements are also possible based on the embodiments disclosed above. In particular, any combination of the disclosed embodiments may be used to practice the invention. All these and other variations are intended to be encompassed by the following claims.

What is claimed is:

1. A semiconductor device, comprising:

a substrate made of a semiconductor material;

an active semiconductor medium formed on said substrate and configured to produce photons in response to an energizing input;

a first semiconductor cladding layer formed on a first side of said active semiconductor medium and in contact with said active semiconductor medium;

a second semiconductor cladding layer formed on a second opposing side of said active semiconductor medium and in contact with said active semiconductor medium, said first and second cladding layers configured to confine said photons within said active semiconductor medium;

a wave-guiding element configured to guide optical waves and disposed on said first side of said active semiconductor medium, said wave-guiding element having a grating which is operable to reflect an optical wave at a specified wavelength that satisfies a phase-matching condition of said grating; and an optical reflector formed on said second side of said active semiconductor medium such that said optical reflector and said grating in said wave-guiding element forms an optical cavity with a cavity optic axis substantially perpendicular to said first and second cladding layers, and said active semiconductor medium.

2. A device as in claim 1, wherein said optical reflector is a Bragg reflector formed of alternating quarter-wavelength dielectric layers.

3. A device as in claim 1, wherein said wave-guiding element is a fiber and said grating is a fiber grating formed in a core of said fiber.

4. A device as in claim 3, wherein one end of said fiber is in contact with said first cladding layer.

5. A device as in claim 3, wherein said fiber grating is configured in such a way that said specified wavelength is within an emission spectrum of said active semiconductor medium.

6. A device as in claim 5, wherein said fiber grating is operable to tune said specified wavelength.

7. A device as in claim 6, wherein said fiber grating is tuned by varying at least one of a grating period and an effective index of refraction of said fiber grating.

8. A device as in claim 1, wherein said active semiconductor medium includes semiconductor layers that form at least one p-n heterojunction.

9. A device as in claim 8, wherein said semiconductor layers form a quantum-well structure.

10. A semiconductor device, comprising:

a substrate made of a semiconductor material;

an active semiconductor medium formed on said substrate and configured to produce photons in response to an energizing input;

a first semiconductor cladding layer formed on a first side of said active semiconductor medium and in contact with said active semiconductor medium;

a second semiconductor cladding layer formed on a second opposing side of said active semiconductor medium and in contact with said active semiconductor medium, said first and second cladding layers configured to confine said photons within said active semiconductor medium;

an optic fiber disposed on said first side of said active semiconductor medium and configured to have a fiber grating, wherein said fiber grating has a grating period and an effective index of refraction to effect a phase-matching condition such that an optical wave at a specified wavelength that satisfies said phase-matching condition is reflected by said fiber grating; and an optical reflector formed on said second side of said active semiconductor medium such that said optical reflector and said grating in said wave-guiding element forms an optical cavity with a cavity optic axis substantially perpendicular to said first and second cladding layers, and said active semiconductor medium.

11. A device as in claim 10, further comprising first and second ohmic contacts respectively formed said first side of said active semiconductor medium to provide a driving current to said active semiconductor medium as said energizing input.

12. A device as in claim 10, wherein said energizing input includes an optical pump beam.

13. A device as in claim 10, wherein said active medium is configured to effect a laser oscillation in said optical cavity at a laser wavelength which is determined by said phase-matching condition of said fiber grating.

14. A device as in claim 13, further comprising means for coupling an optical modulation beam into said active semiconductor medium which overlaps an optical path of said laser oscillation and has a wavelength different from said laser wavelength, wherein said active semiconductor medium has a positive gain at said wavelength of said modulation beam so that an intensity modulation in said modulation beam effects a corresponding intensity modulation in said laser oscillation at said laser wavelength.

15. A device as in claim 14, wherein said wavelength of said modulation beam is shorter than said laser wavelength to effect a signal conversion from said modulation beam to said laser oscillation.

16. A device as in claim 14, wherein said wavelength of said modulation beam is longer than said laser wavelength to effect a signal conversion from said modulation beam to said laser oscillation.

17. A device as in claim 13, wherein said fiber grating is operable to tune said laser wavelength.

18. A device as in claim 10, wherein said fiber includes a doped fiber gain section and further comprising means for coupling an optical pump beam into said doped fiber gain section.

19. A device as in claim 18, wherein said doped fiber gain section is located between said fiber grating and said active semiconductor medium.

20. A device as in claim 10, wherein said reflector is formed of another optic fiber having another fiber grating.

21. A device as in claim 10, further comprising a second fiber with a second fiber grating disposed relative to said fiber grating on said first side of said active semiconductor medium to form a second optical cavity with said optical reflector.

22. A device as in claim 21, wherein said second fiber grating has a second grating period and a second effective index of refraction to effect a second phase-matching condition different from said phase-matching condition.

23. A device as in claim 10, wherein said fiber is a single-mode fiber.

24. A method of constructing a semiconductor device, comprising:

forming an active semiconductor medium formed on a substrate to produce photons in response to an energizing input;

placing an optic fiber having a fiber grating on a first side of said active semiconductor medium to provide optical coupling between said fiber grating and said active semiconductor medium; and placing an optical reflector on a second side of said active semiconductor medium opposing said first side such that said optical reflector and said fiber grating forms an optical cavity with a cavity optic axis substantially perpendicular to said active semiconductor medium.

25. A method of performing a signal conversion by using a semiconductor laser having an active semiconductor medium enclosed in an optical cavity which is formed of a reflector and a fiber with a fiber grating, comprising:

providing a first signal beam at a first wavelength at which said active semiconductor medium exhibits a positive gain;

modulating the amplitude of said first signal beam to superimpose data on said first signal beam to form a first modulated signal beam; and injecting said first modulated signal beam into said active semiconductor medium to effect an amplitude modulation of a laser output of said semiconductor laser at a laser wavelength that is different from said first wavelength, whereby said data is converted from said first wavelength into said laser wavelength.

26. A method as in claim 25, further comprising controlling said fiber grating to tune said laser wavelength.

* * * * *

UNITED STATES PATENT AND TRADEMARK OFFICE
CERTIFICATE OF CORRECTION

PATENT NO.   : 6,088,376
DATED        : July 11, 2000
INVENTOR(S)  : John O'Brien et al.

It is certified that error appears in the above-identified patent and that said Letters Patent is hereby corrected as shown below:

<u>Column 1,</u>
Line 8, before "FIELD OF THE INVENTION", please insert the following:

-- STATEMENT AS TO FEDERALLY-SPONSORED RESEARCH
      The U.S. Government has certain rights in this invention pursuant to Grant No. N00014-91-J-1195 awarded by ONR. --

Signed and Sealed this

Eleventh Day of February, 2003

JAMES E. ROGAN
*Director of the United States Patent and Trademark Office*